(12) United States Patent
Roodenburg et al.

(10) Patent No.: US 8,142,107 B2
(45) Date of Patent: Mar. 27, 2012

(54) OFFSHORE SYSTEM

(75) Inventors: Joop Roodenburg, Delft (NL); Jurjen Rinnert Haitsma, Rotterdam (NL); Laurens Cornelis Claassen, The Hague (NL)

(73) Assignee: Itrec B.V., Schiedam (NL)

( * ) Notice: Subject to any disclaimer, the term of this patent is extended or adjusted under 35 U.S.C. 154(b) by 593 days.

(21) Appl. No.: 12/086,769

(22) PCT Filed: Dec. 21, 2005

(86) PCT No.: PCT/NL2005/000857
§ 371 (c)(1),
(2), (4) Date: Feb. 20, 2009

(87) PCT Pub. No.: WO2007/073146
PCT Pub. Date: Jun. 28, 2007

(65) Prior Publication Data
US 2009/0220306 A1 Sep. 3, 2009

(51) Int. Cl.
*F16L 1/12* (2006.01)
(52) U.S. Cl. ...... 405/166; 405/158; 405/170; 414/22.56
(58) Field of Classification Search ............... 405/154.1, 405/158, 166, 169, 170; 414/22.56, 22.64; 114/264, 265; 166/358, 367, 339, 341
See application file for complete search history.

(56) References Cited

U.S. PATENT DOCUMENTS

| 4,472,079 | A | 9/1984 | Langner |
| 6,293,732 | B1 * | 9/2001 | Baugh ............... 405/170 |
| 6,361,262 | B1 | 3/2002 | Roodenburg et al. |
| 6,763,898 | B1 | 7/2004 | Roodenburg et al. |
| 6,868,902 | B1 | 3/2005 | Roodenburg et al. |
| 6,926,259 | B1 | 8/2005 | Roodenburg et al. |
| 6,932,553 | B1 | 8/2005 | Roodenburg et al. |
| 2004/0089215 | A1 | 5/2004 | Roodenburg et al. |
| 2005/0207849 | A1 | 9/2005 | Roodenburg et al. |
| 2007/0251725 | A1 * | 11/2007 | Banks ............... 175/5 |

FOREIGN PATENT DOCUMENTS

WO  WO-2004/020275 A2  3/2004
WO  WO-2005/059297 A2  6/2005

* cited by examiner

*Primary Examiner* — John Kreck
*Assistant Examiner* — Sean Andrish
(74) *Attorney, Agent, or Firm* — Birch, Stewart, Kolasch & Birch, LLP

(57) ABSTRACT

This invention relates to an offshore system, comprising a drilling vessel, e.g. a semi-submersible drilling vessel comprising a deck on which a drilling tower for performing drilling operations is mounted. The vessel is furthermore provided with a support for a tiltable J-lay tower for laying a pipeline, said support being arranged next to the drilling tower, and the offshore system further includes a J-lay tower which is or can be mounted on said support.

29 Claims, 6 Drawing Sheets

OFFSHORE SYSTEM

BACKGROUND OF THE INVENTION

1. Field of the Invention:

The invention relates to an offshore system, comprising a drilling vessel, e.g. a semi-submersible drilling vessel comprising a deck on which a drilling tower for performing drilling operations is mounted.

2. Background of the Invention:

Such an offshore system is well known and commonly used to perform drilling operations. The main disadvantage of such a system is that such a drilling vessel that can only perform drilling operations is inefficient when performing other operations and therefore has a high total running cost.

It is known to overcome this drawback by replacing the drilling tower by a multipurpose tower, as described in U.S. Pat. No. 6,871,609. Such a multipurpose tower can be used to perform maintenance operations, as well as drilling operations. This increases the efficiency of an offshore system.

In WO 2005/059297, WO 2004/020275, U.S. Pat. Nos. 6,932,553, 6,868,902, 6,763,898, 6,926,259 (in particular FIG. 13) by the present applicant specific designs of multipurpose towers and the use thereof is disclosed. The information and contents of these documents is herein incorporated by reference. Common prior art vessels are only suitable for drilling. US 2004/089215 by the present applicant discloses a vessel suitable for both drilling and well maintenance. The content of this application is also herein incorporated by reference.

SUMMARY OF THE INVENTION

The aim of the present invention is to propose an alternative and even more versatile offshore system. Ideally, this results in an offshore system with lower total running costs that can be more efficient.

According to the invention the vessel is furthermore provided with a support for a tiltable J-lay tower for laying a pipeline, said support being arranged next to the drilling tower, and the offshore system further includes a J-lay tower which is or can be mounted on said support.

A tiltable J-lay tower is capable of launching the pipeline at variable lay angles, and thus at various combinations of water depth and pipeline. Preferably, laying angles between 10-15° can be applied. The offshore system according to the invention can be placed near a possible well, and with the offshore system both a well can be drilled, and a pipeline can be laid from said well to another location, capable of removing oil from the well. This allows to reduce the time to "first oil" when developing an oil field. The J-lay tower can be mounted on the vessel when moving to a desired location, but it is also possible to use the vessel without the J-lay tower, and install the J-lay tower when desired. It is possible to store the J-lay tower in a storage place on deck or in a column of the vessel, e.g. a stability column. Preferably, the J-lay system (tower) can be broken down into several components, each weighting not more than the maximal SWL of the drilling rig cranes. The components (or the complete J-Lay tower) can be stored on deck or inside one or more of the vessels columns. This saves deckspace and is advantageous for the centre of gravity.

Any type of drilling vessel can be used for the offshore system according to the invention, e.g. a monohull vessel, a drilling rig or a semi-submersible vessel, or a catamaran-shaped vessel with two or three hulls.

The drilling tower can be adapted to perform any type of drilling operations. As a drilling tower, a mast or a derrick can be provided. In a preferred embodiment, a drilling tower embodied as a multipurpose tower is placed on the deck next to the J-lay tower. Preferably, the mast has an essentially closed outer wall. The multipurpose tower can be fitted with main and auxiliary trolleys, hoists, cables, as well as accommodations for an elevating working platform. Preferably, means for heave compensation are provided in the mast that can be used when lowering risers etc. In general, such an offshore system can be used for placing a BOP (surface blow out preventer) and a riser string, placing a drill string and performing drilling operations and possibly providing casing.

Preferably, in the deck of the drilling vessel a moonpool opening is provided through which the drilling tower can perform its drilling operations. In a preferred embodiment, the J-lay tower can lay a pipeline through the same moonpool opening. This is advantageous since the vessel is not modified more than necessary, which modification might result in a decrease in stiffness of the structure of the vessel. Preferably the moonpool is large enough and designed such that it is possible for the J-lay tower to lay the pipeline while drilling equipment such as risers, drillstrings, workoverriser are still in the moonpool. More preferably, drilling equipment such as a riser, a drillstring or a workoverriser is displaceable, e.g. skiddable in the moonpool. For example, the equipment is displaceable along the moonpool from one side of the drilling tower to the opposite side of the drilling tower, and possible also under the J-lay tower to a part of the moonpool away from the pipeline laying area of the J-lay tower, even if this tower is tilted. It is very advantageous when e.g. the riser string with submerged BOP does not need to be retrieved when performing the J-lay operations. In a preferred embodiment the riser string with submerged BOP is skidded out of the way during J-lay operations and at the end of the J-lay operations is skidded in operational position again. This avoids the very time consuming process of retrieving a large number of riser joints and storing those. It is also very advantageous when the J-lay tower when connected to the drilling tower does not interfere with the normal operations on a drilling rig.

Commonly, the drilling tower is provided with a hoisting system for lowering and raising drilling equipment such as drill strings and risers. A J-lay tower is commonly provided with pipeline lowering equipment for lowering the pipeline. In a preferred embodiment, the hoisting system and the lowering equipment are adapted to be interconnected, such that the capacity of the hoisting system of the drilling tower is used for lowering the pipeline to be laid with said J-lay tower. For example, the top of the J-lay tower is provided with a crown block and the drilling tower is provided with an intermediate block, across which blocks a hoisting cable of the hoisting equipment of the drilling tower is connectable. The intermediate block can be such that it is both connectable to the J-lay tower and to the drilling tower, depending on the desired hoisting operation of the drilling tower. The intermediate block can be moved out of the hoisting area when performing drilling operations or laying risers, and connected to the drilling tower when perform J-lay operations. The capacity of the J-lay system according to the invention can be from as low as 100 tonnes to up to 1000 tonnes or more.

In a specific embodiment the offshore system is also capable of performing maintenance operations, e.g. well maintenance. Today a significant percentage of the production equipment is not installed on the surface of the sea, but on the sea bottom. As with all equipment, the equipment on the sea bottom needs regular maintenance. Specifically, during the lifetime of an oilfield, the bore holes and the oilfield itself need maintenance to keep the production as high as possible.

Maintenance of the oil field and the production equipment on the sea bottom is a difficult task that is both time intensive and very expensive.

Preferably, in an offshore system according to the invention, the J-lay tower does not interfere with the normal operations of the drilling vessel, such as riser running, drilling operations, etc.

BRIEF DESCRIPTION OF THE DRAWINGS

The invention will be best understood by reference to the following detailed description taken in connection with the accompanying drawings.

DETAILED DESCRIPTION OF THE PREFERRED EMBODIMENTS

Figure 1:
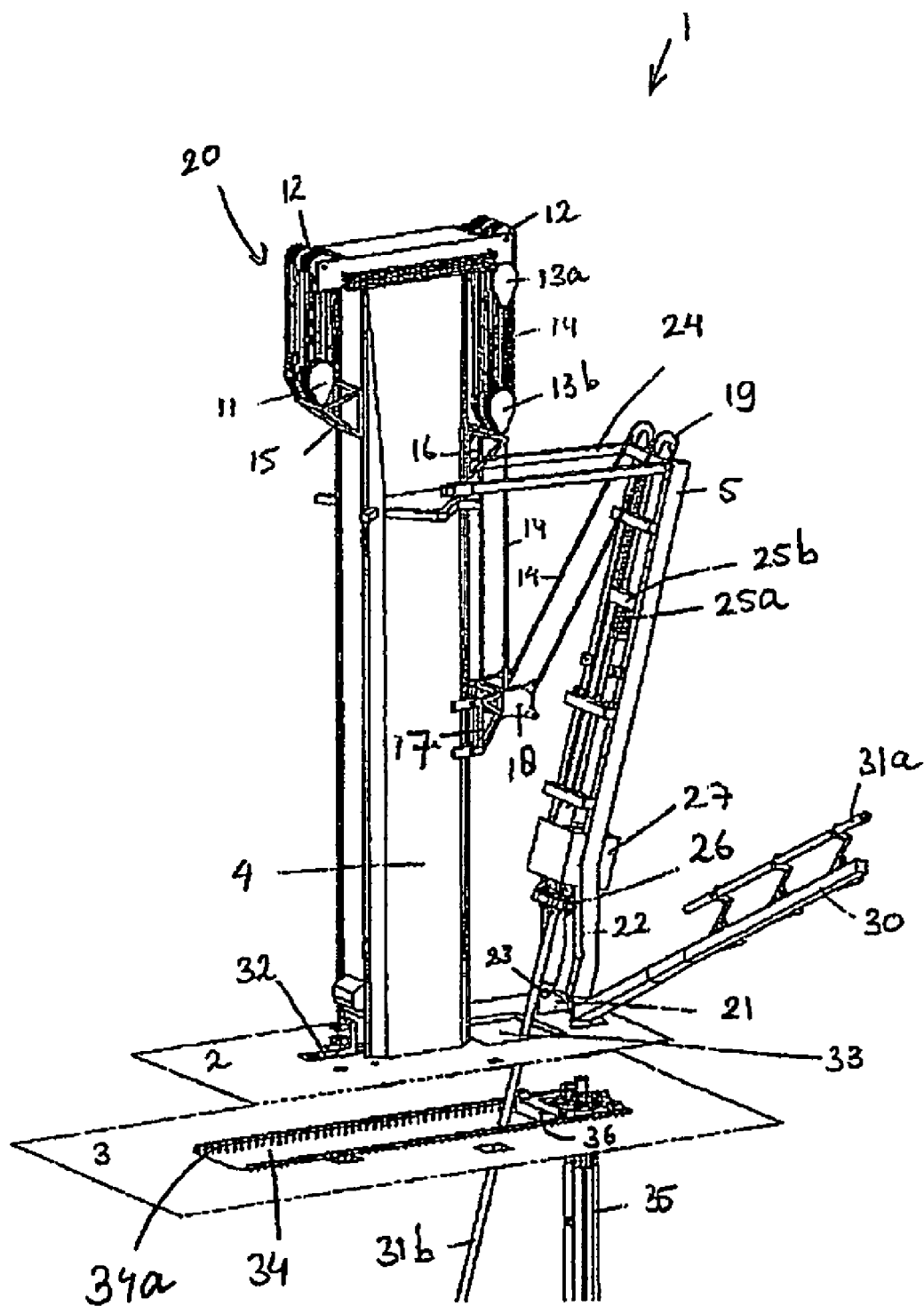
FIG. 1 shows a schematic presentation of a possible embodiment of an offshore system according to the invention.

In FIG. 1 a schematic presentation of a possible embodiment of an offshore system 1 according to the invention is shown. From the vessel only part of an upper deck 2 and part of a lower deck 3 is shown. On the upper deck 2 a drilling tower 4, here a multipurpose tower is mounted. The tower is here embodied as a mast having an essentially closed outer wall. The mast here has a rectangular cross-section with an interior space allowing the internal arrangement of one or more winches and/or a heave compensation system. As an alternative tower a derrick could be used having a lattice structure as is well known in the art. Next to the multipurpose tower a tiltable J-lay tower 5 is mounted.

The multipurpose tower 4 comprises a hoist system 20 comprising blocks 11, pulleys 12 and in the shown embodiment a splittable block 13a and 13b for hoisting cables 14. It needs to be pointed out that although splittable blocks are the preferred embodiment also normal types of blocks can be used. The hoist system 20 may further comprise one ore more winches, preferably located inside the multipurpose tower. Lower block 13b is a travelling block. At one side of the tower 4, in the drawing on the left side of the tower 4, travelling block 11 of hoist system 20 is connected to a trolley 15. Trolley 15 is moveable along multipurpose tower 4 and can e.g. be used for lowering drill pipes, casing etc. etc. Trolley 15 can be made moveable to the inside of tower 4 if desired. A moonpool opening 32 is left open on deck 2 for the pipes, risers, casing etc. to pass through.

At the other side of tower 4, in the drawing on the right side of the tower 4, the hoist system 20 is connected to a trolley 16. This trolley can e.g. be used for lowering a BOP, risers, slipjoints, maintenance equipment etc. etc. When used for lowering risers, trolley 16 is often referred to as a running tool.

In the shown embodiment, hoist system 20 is connected to trolley 17 via cable 14. To trolley 17 an intermediate block 18 is connected. A hoisting cable 14 is connected via trolley 17 and block 18 to crown block 19 on the J-lay tower 5. Crown block 19 may comprise pulleys. Hence, in the shown embodiment, hoist system 20 is used for lowering pipes in the J-lay tower 5. In deck 2, a moonpool opening 33 is provided through which the lowered items can pass through the deck. Preferably, the moonpool opening 33 can be enlarged when lowering large items such as a BOP, and made smaller when lowering smaller items such as pipes.

A J-lay tower support 21 is mounted on deck 2 for supporting the J-lay tower 5 on deck and connecting the tower to the deck 2. Frame part 22 of J-lay tower 5 is tiltable about the support 21 about tilting or pivot axis 23. J-lay tower 5 is furthermore connected to multipurpose tower 4 via an adjuster 24, here near the upper end of the J-lay tower. The adjuster 24 can adjust the distance between the top of J-lay tower 5 and the multipurpose tower 4. Since the J-lay tower is connected to the deck via the J-lay tower support 21 the adjuster also adjusts the tilt angle of the J-lay tower.

J-lay tower 5 comprises, here just like conventional J-lay towers, a mobile clamp 25a, a hold-off clamp 26 (also called a hang off clamp) and at least one welding station or workstation 27. The J-lay tower can also comprise separate coating, NDT and/or blasting stations. In a particular embodiment, welding takes place above deck 2, while coating and non-destructive testing takes place below deck 2. A pipeloader 30 is provided on deck 2 to load pipes 31a into J-lay tower 5. Hoist system 20 is connected via crown block 19 to a travelling block 25b, positioned above and connected to mobile clamp 25a. It can be seen that in this embodiment the J-lay tower does not interfere with normal drilling operations, or riser running operations.

The lower deck 3 is provided with a single large moonpool opening 34, positioned below moonpool openings 32 and 33 in the upper deck 2. In the shown embodiment, a launched pipeline 31b (or pipestring) is lowered tiltedly through moonpool opening 33 in upper deck 2 and moonpool opening 34 in lower deck 3.

In the shown embodiment a riser string 35, possibly with a slipjoint and/or BOP is movable in the moonpool opening 34. Hence, the riser string can be lowered at the right side of multiple purpose tower 4, and subsequently move through moonpool opening 34 to the other side of multiple purpose tower 4 (the left side in the drawing) where a drill string can be provided through the riser string and/or slipjoint. The moonpool opening 34 may be provided with rails 34a across which a trolley 36 to which the riser string 35 is connected may travel. In the shown embodiment, the riser string can move under the J-lay tower and the multipurpose tower, towards a remote end of the moonpool away from the pipeline laying area through which the J-lay pipes pass the moonpool. Hence, it is possible to J-lay pipes with the riser string still hanging in the moonpool.

Figure 2:
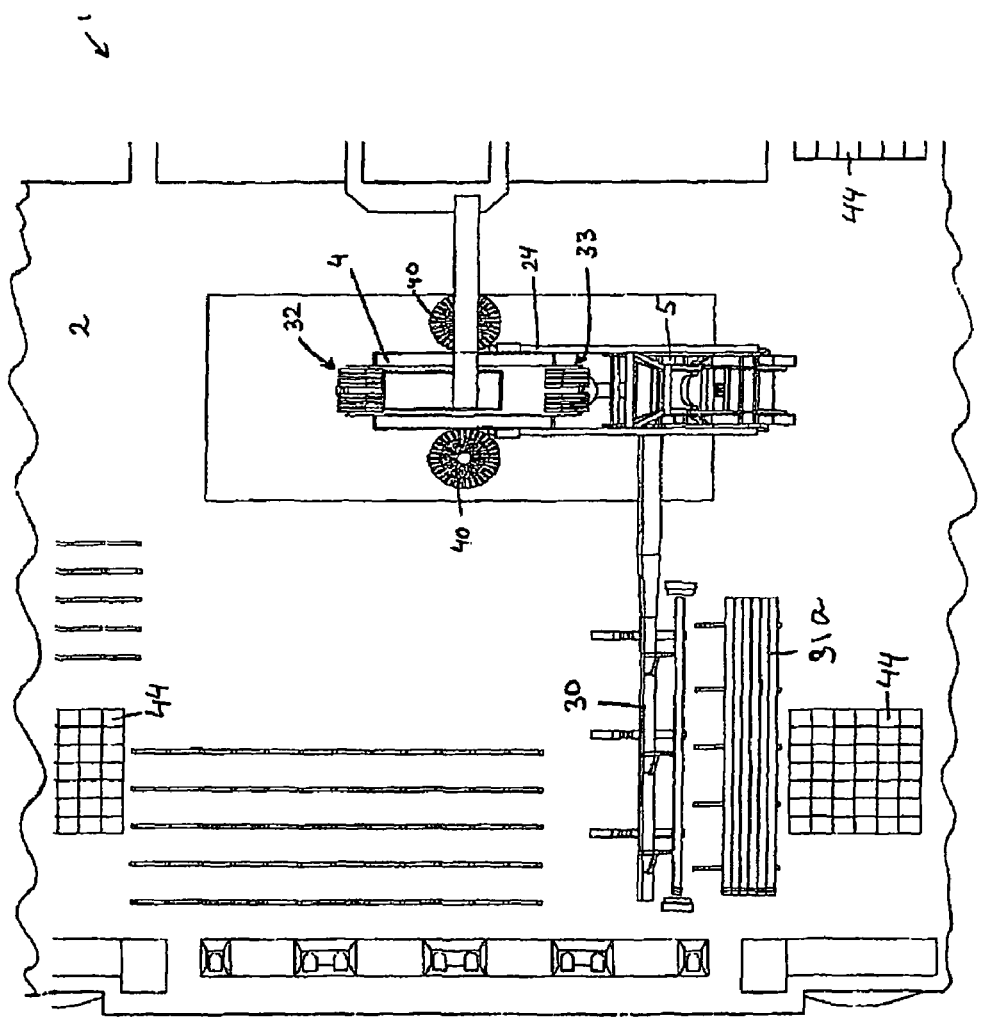
FIG. 2 shows a view from above at the deck of a drilling vessel according to the invention.

FIG. 2 shows a view from above at the deck 2 of a drilling vessel according to the invention. Such a deck can for example measure 70×80 m. At deck 2, a multipurpose drilling tower 4 is positioned. At a first side of multipurpose tower 4, a drill string can be lowered from the vessel. Moonpool opening 32 is left open on deck 2 for pipes, casing etc. to pass through. A setback drum 40, preferably a double rotating setback drum is provided close to the multipurpose tower 4 to store (parts of) the drill string.

Possibly, the multipurpose tower 4 is capable of dual drilling, by drilling at both sides of multipurpose tower 4. Therefor it is required that at both sides of the tower a hoisting system is provided with a travelling block and a trolley and moonpool openings are provided on deck. The offshore system shown in FIG. 1 is capable of performing dual drilling since hoist system 20 comprises on one side travelling block 11, trolleys 15 and moonpool opening 32 and on the other side travelling block 13b, trolley 16 and moonpool opening 33. Possibly, but not necessarily, a drill pipe loader (not shown) is provided on deck 2 to present or alternatively remove drill pipes.

Possibly, provisions are made on deck to perform reeled casing. A tower (not shown) can be placed on deck, comprising a reel over which casing can be led and lowered through moonpool opening 32 on deck. Casing reels can be stored on deck or provided by ships, when necessary.

Next to multipurpose tower 4, on the opposite side of moonpool opening 32, moonpool opening 33 is provided, through which objects can be lowered into the sea by the aid of hoist system 20 (shown in FIG. 1) present at multipurpose tower 4. Possibly, moonpool opening 33 can be enlarged when desired for lowering large objects. For example, a BOP (not shown) can be lowered though moonpool opening 33. In a preferred embodiment, BOP handling can take place on deck. Preferably, the BOP is skiddable over deck 2, to be placed under hoist system 20 above moonpool opening 33 and moonpool opening 34 (shown in FIG. 1) when the BOP is to be lowered. Also, it is possible to lower a slipjoint (not shown) through moonpool opening 33. Preferably, also this slipjoint is provided skiddable on deck.

Preferably, risers can be lowered through moonpool opening 33. Risers can be stored in vertical riser storages 44 provided at the corners of the deck 2 of the vessel. Other riser storage places, e.g. on deck or on another vessel are also possible. Risers can be presented above moonpool opening 33 to hoist system 20 (shown in FIG. 1) by a riser handler (not shown).

J-lay tower 5 is provided next to multipurpose tower 4 on deck 2. With the aid of J-lay tower 5 a pipeline can be laid through moonpool opening 33 and moonpool opening 34 (shown in FIG. 1). Any type of pipeloader 30 can be provided on deck 2 to offer pipes 31a to J-lay tower 5.

The offshore system according to the invention can possibly further be provided with:
- a mooring system comprising mooring winches,
- a chinook capable helicopter platform,
- offshore cranes, possibly a heavy lift crane,
- a mud system and brine pumps.

In FIG. 3 the operation of an embodiment of an offshore system according to the invention is explained. The same numbering as used in FIG. 1 is applied.

Figure 3C:
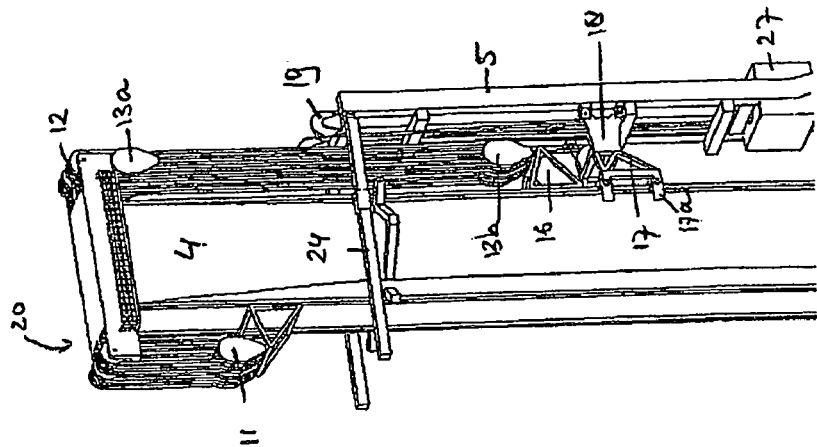
FIG. 3 shows the operation of an embodiment of an offshore system according to the invention.
Figure 3B:
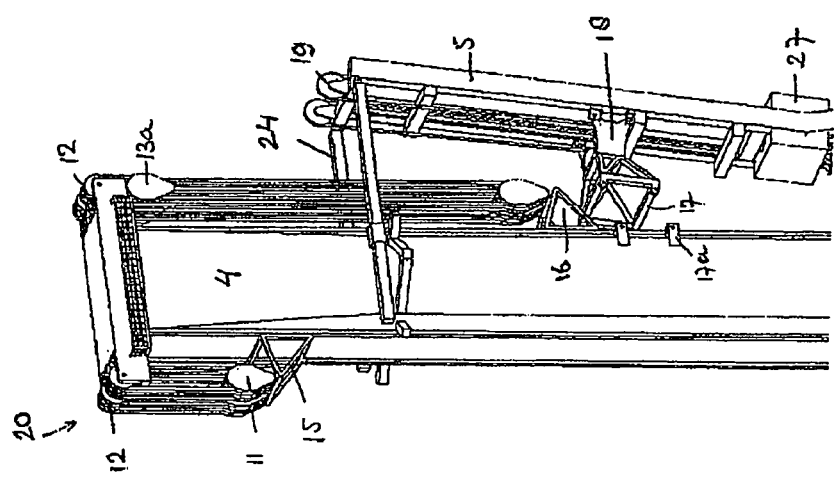
Figure 3A:
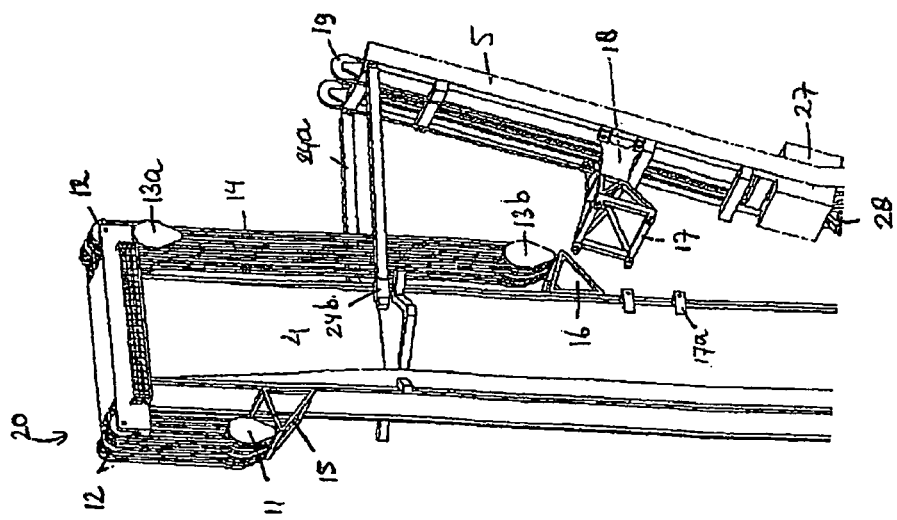

FIG. 3a shows the multipurpose tower 4 in a rest mode, in principle capable of lowering risers with the aid of hoist system 20, composed of cables 14, trolley 16, and splittable block 13a and 13b. J-lay tower 5 is tilted away from the multipurpose tower 4, and connected to the multipurpose tower 4 via adjuster 24. Adjuster 24 comprises a part 24a connected to J-lay tower 5, and a part 24b connected to multipurpose tower 4, through which part 24a of the adjuster 24 can move. Trolley 17 with intermediate block 18 is connected to the J-lay tower 5. In J-lay tower 5, welding station 27 and crown block 19 are visible.

In FIGS. 3b and 3c it is shown that J-lay tower 5 gradually moves towards multipurpose tower 4 by adjusting the adjuster 24 between the multipurpose tower 4 and J-lay tower 5, by pivoting about pivot axis 23 (see FIG. 1). It is possible to install a roll compensation system (not shown) on the adjusters. When J-lay tower 5 is next to multipurpose tower 4, as shown in FIGS. 3c and 3d, trolley 17 can connect with trolley connection points 17a on multipurpose tower 4. As a result of this, trolley 17 is connected to multipurpose tower 4 (as was also shown in FIG. 1) instead of to J-lay tower 5 (as shown in FIG. 3a). The J-lay tower 5 comprises connection points 17b to connect trolley 17 and intermediate block 18 to when connected to the J-lay tower 5. In FIG. 3d, trolley 17 is connected to multipurpose tower 4, and cables 14 of hoist system 20 are connected to intermediate block 18. Cable parts 14' are shown in FIG. 3d between block 13b and block 18. In FIG. 3e, cable parts 14" are visible between intermediate block 18 and crown block 19. Hence, via blocks 13b, 18 and 19, and cables 14, 14' and 14", hoist system 20 on multipurpose tower 4 is connected to J-lay tower 5.

In another embodiment (not shown) the intermediate block is connected to the deck of the vessel, in the vicinity of the J-lay tower supports. This embodiment does not generate large forces on the adjusters, or the drilling tower, but is more elaborate to install.

Figure 3F:
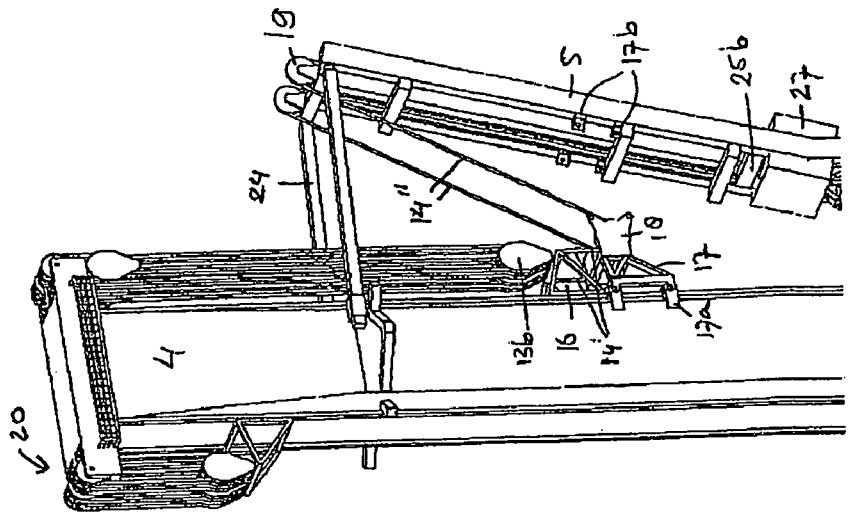
Figure 3E:
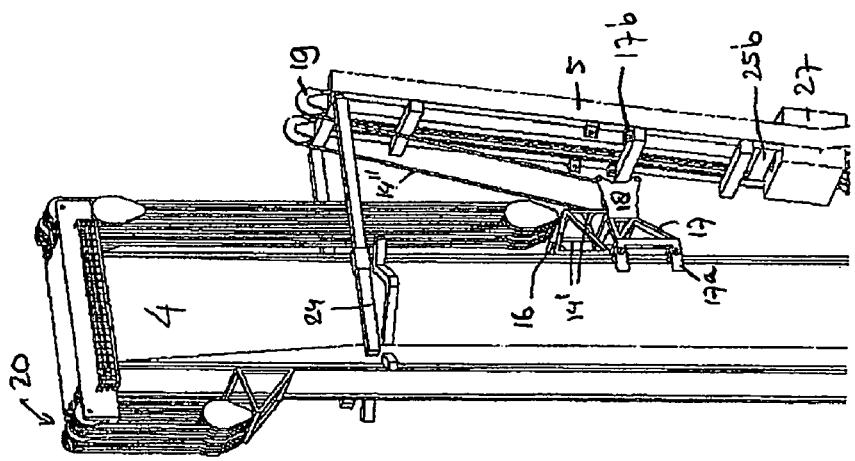
Figure 3D:
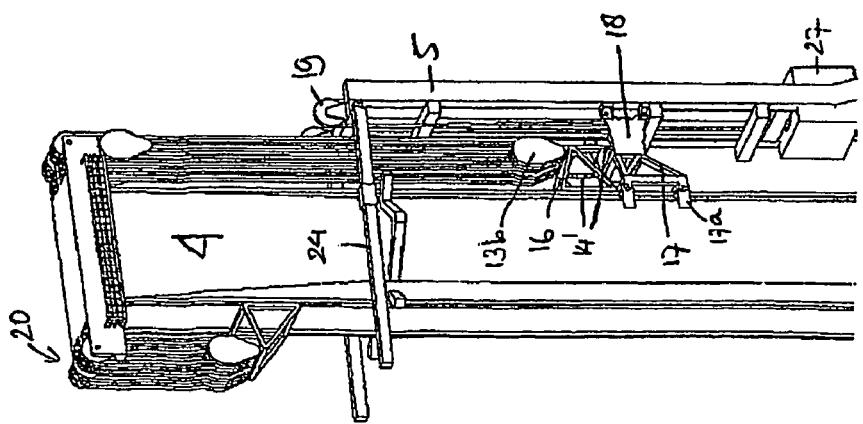
Figure 3I:
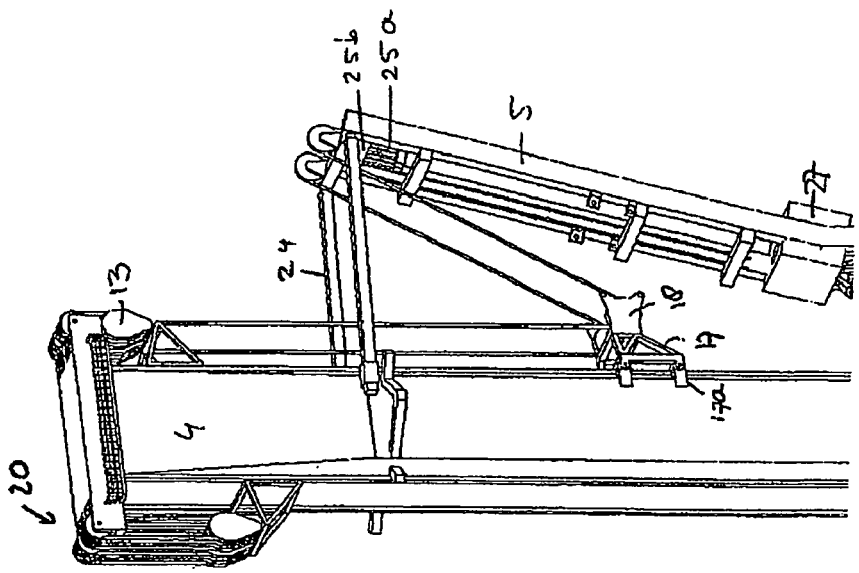
Figure 3H:
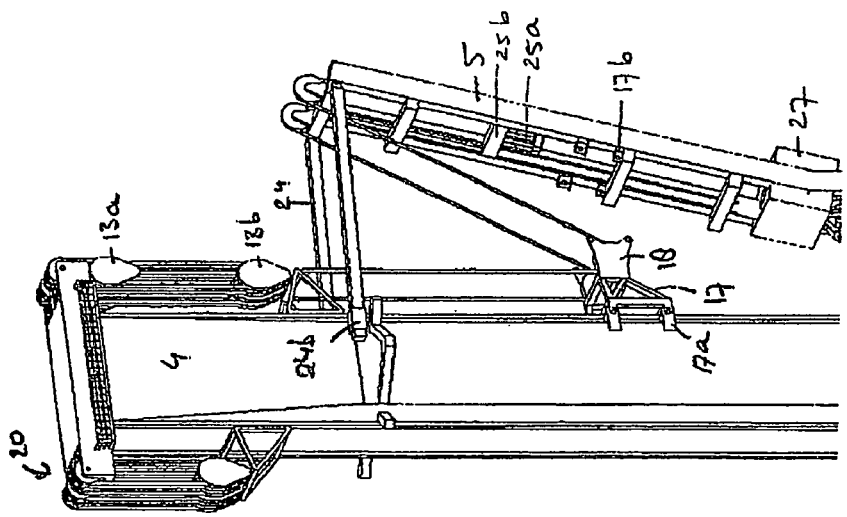
Figure 3G:
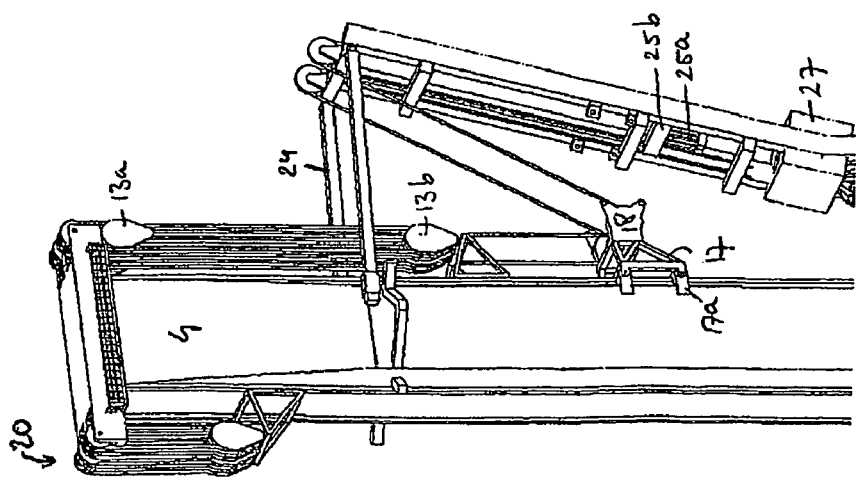

In FIG. 3f, J-lay tower 5 is shown in a position tilted away from the multipurpose tower 4, but connected to the hoist system 20 of the multipurpose tower 4. Therefor, the J-lay tower 5 may use the winch capacity or hoist capacity of the multipurpose tower 4. In FIGS. 3g-3i, the operation of the J-lay tower 5 is shown. Hoist system 20 raises travelling block 25b and mobile clamp 25a in the J-lay tower 5. During this hoisting operation, part 13b of the splittable block moves into part 13a of the splittable block. When the travelling block 25b and the mobile clamp 25a are at the uppermost position in J-lay tower 5, a pipe 31a can be loaded into the tower as shown in FIG. 1.

FIG. 4 shows various possible setups of an offshore system according to the invention, with a drilling tower 40 and a tilted J-lay tower 41 placed on deck 42. The J-lay tower may comprise its own hoist system, but may also use the winch capacity of the drilling tower 40 by means of blocks and pulleys. In the setups shown in FIGS. 4a and 4b, the J-lay tower 41 is tilted about a sharp angle α with respect to the drilling tower 40. In both setups, the support for the J-lay tower 40 is close to the base of the drilling tower 40.

Figure 4A:
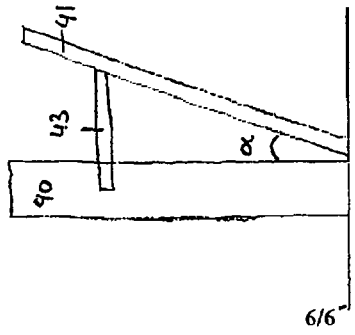
FIG. 4 shows various possible setups of an offshore system according to the invention.
Figure 4B:
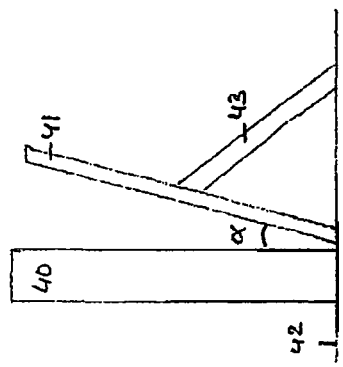

In the setup shown in FIG. 4a, an adjuster 43 supporting the weight of the J-lay tower 41 is provided between the J-lay tower 41 and the drilling tower 40, as shown in FIGS. 1 and 3. In the setup shown in FIG. 4b, the adjuster 43 is placed on deck. An advantage of this setup is that the drilling tower 40 does not need to carry the weight of the J-lay tower 41, a drawback of such a setup is the required space on deck 42.

Figure 4C:
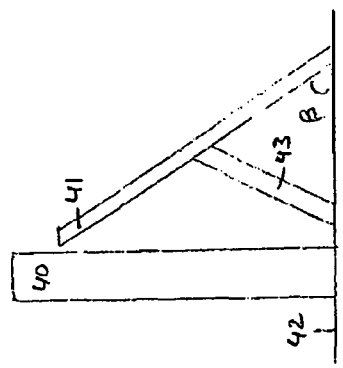
Figure 4D:
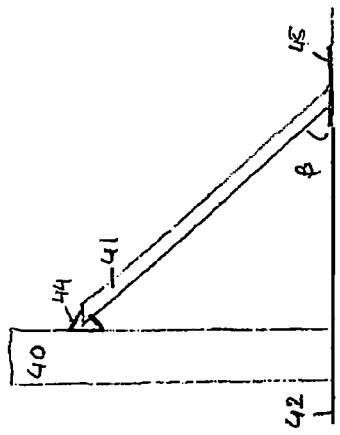

In the setups shown in FIGS. 4c and 4d, the J-lay tower includes a sharp angle β with deck 42. In the setup shown in FIG. 4c, the adjuster 43 is placed on deck 42. In the setup shown in FIG. 4d, the drilling tower 40 supports the tilted J-lay tower 41. The tilt angle β of J-lay tower 41 can be adjusted by a trolley 44, positioned between drilling tower 40 and J-lay tower 41, and by a slide 45, positioned between J-lay tower 41 and deck 42. Slide 45 can e.g. be composed of rails provided on deck 42 and wheels connected to J-lay tower 41. Drawbacks of the setups shown in FIGS. 4c and 4d is the required space on deck 42, and the large size of the moonpool opening required to lower both drill pipes from the drilling tower 40 and pipes from J-lay tower 41. The size of the moonpool opening can be a less important problem when a catamaran shaped vessel is used.

The invention claimed is:

1. An offshore system, comprising a drilling vessel, comprising a deck on which a drilling tower for performing drilling operations is mounted, wherein
the vessel is furthermore provided with a support for a tiltable J-lay tower for laying a pipeline, said support being arranged next to the drilling tower, and the offshore system further includes the J-lay tower which is mounted on said support, and
the drilling tower is provided with a hoisting system having a capacity for lowering and raising drilling equipment, the J-lay tower is provided with pipeline lowering equipment for lowering the pipeline, and the hoisting system and the lowering equipment are adapted to be interconnected, such that the capacity of the hoisting system of the drilling tower is used for lowering the pipeline located in the J-lay tower and moving a mobile clamp of the J-lay tower.

2. The offshore system according to claim 1, wherein the drilling tower is a multipurpose tower.

3. The offshore system according to claim 1, wherein the drilling tower is a derrick.

4. The offshore system according to claim 1, wherein in the deck of the drilling vessel a moonpool opening is provided through which the drilling tower performs its drilling operations, and through the same moonpool opening the J-lay tower lays the pipeline.

5. The offshore system according to claim 1, wherein in the deck of the drilling vessel a moonpool opening is provided through which the drilling tower performs the drilling operations, and wherein the J-lay tower lays the pipeline while drilling equipment is still in the moonpool opening.

6. The offshore system according to claim 1, wherein in the deck of the drilling vessel a moonpool opening is provided through which the drilling tower performs the drilling operations, and wherein drilling equipment is displaceable in the moonpool opening.

7. The offshore system according to claim 1, wherein the J-lay tower has a top which is provided with a crown block and the drilling tower is provided with an intermediate block, across which blocks a hoisting cable of the hoisting system of the drilling tower is connectable.

8. The offshore system according to claim 7, wherein the intermediate block is connectable to the J-lay tower and to the drilling tower, depending on the hoisting operation of the drilling tower.

9. The offshore system according to claim 1, wherein the J-lay tower has a tilt angle and is supported by an adjuster, that is capable of adjusting the tilt angle of the J-lay tower.

10. The offshore system according to claim 9, wherein the adjuster is positioned between the J-lay tower and the deck of the drilling vessel.

11. The offshore system according to claim 9, wherein the adjuster is positioned between the J-lay tower and the drilling tower.

12. The offshore system according to claim 9, wherein the J-lay tower does not interfere with the normal operations of the drilling vessel.

13. A method of laying a pipeline, using the offshore system of claim 1, the method comprising the steps of:
assembling the J-lay tower;
mounting the J-lay tower on the support on the drilling vessel;
setting the J-lay tower to a desired laying angle;
transporting pipes to the J-lay tower;
connecting pipes to each other; and
lowering the pipeline.

14. The method according to claim 13, wherein in the deck of the drilling vessel a moonpool opening is provided through which the drilling tower performs drilling operations, and wherein drilling equipment is skiddable in the moonpool opening, wherein after the J-lay tower is mounted on the support on the drilling vessel, the drilling equipment is skidded to one side of the moonpool opening.

15. The method according to claim 13, wherein after setting the J-lay tower to a desired angle, two or more pipes are connected together on the deck, which pipes are subsequently transported to the J-lay tower.

16. The method according to claim 15, wherein connecting of the pipes takes place by welding.

17. An offshore system, comprising a drilling vessel, comprising a deck on which a drilling tower for performing drilling operations is mounted, wherein
the vessel is furthermore provided with a support for a tiltable J-lay tower for laying a pipeline, said support being arranged next to the drilling tower, and the offshore system further includes the J-lay tower which is mounted on said support,
the J-lay tower has a tilt angle and is supported by an adjuster, that is capable of adjusting the tilt angle of the J-lay tower,
the adjuster is positioned between the J-lay tower and the drilling tower, and
the J-lay tower has a top which is provided with a crown block and the drilling tower is provided with an intermediate block, across which blocks a hoisting cable of the hoisting system of the drilling tower is connectable.

18. The offshore system according to claim 17, wherein the drilling tower is a multipurpose tower.

19. The offshore system according to claim 17, wherein the drilling tower is a derrick.

20. The offshore system according to claim 17, wherein in the deck of the drilling vessel a moonpool opening is provided through which the drilling tower performs the drilling operations, and through the same moonpool opening the J-lay tower lays the pipeline.

21. The offshore system according to claim 17 wherein in the deck of the drilling vessel a moonpool opening is provided through which the drilling tower performs the drilling operations, and wherein the J-lay tower lays the pipeline while drilling equipment is still in the moonpool opening.

22. The offshore system according to claim 17, wherein in the deck of the drilling vessel a moonpool opening is provided through which the drilling tower performs the drilling operations, and wherein drilling equipment is displaceable in the moonpool opening.

23. The offshore system according to claim 17, wherein the drilling tower is provided with a hoisting system having a capacity for lowering and raising drilling equipment, and wherein the J-lay tower is provided with pipeline lowering equipment for lowering the pipeline, wherein the hoisting system and the lowering equipment are adapted to be interconnected, such that the capacity of the hoisting system of the drilling tower is used for lowering the pipeline.

24. The offshore system according to claim 17, wherein the intermediate block is connectable to the J-lay tower and to the drilling tower, depending on the hoisting operation of the drilling tower.

25. The offshore system according to claim 17, wherein the J-lay tower does not interfere with the normal operations of the drilling vessel.

26. A method of laying a pipeline, using the offshore system of claim 17, the method comprising the steps of:
assembling the J-lay tower;
mounting the J-lay tower on the support on the drilling vessel;
setting the J-lay tower to a desired laying angle;
transporting pipes to the J-lay tower;
connecting pipes to each other; and
lowering the pipeline.

27. The method according to claim 26, wherein in the deck of the drilling vessel a moonpool opening is provided through which the drilling tower performs the drilling operations, and wherein drilling equipment is skiddable in the moonpool opening, wherein after the J-lay tower is mounted on the support on the drilling vessel, the drilling equipment is skidded to one side of the moonpool opening.

28. The method according to claim 26, wherein after setting the J-lay tower to a desired angle, two or more pipes are connected together on the deck, which pipes are subsequently transported to the J-lay tower.

29. The method according to claim 28, wherein connecting of the pipes takes place by welding.

* * * * *